R. PERRINE & S. M. STEWART.
Improvement in Hose-Carriages.
No. 5,032. Reissued Aug. 13, 1872.
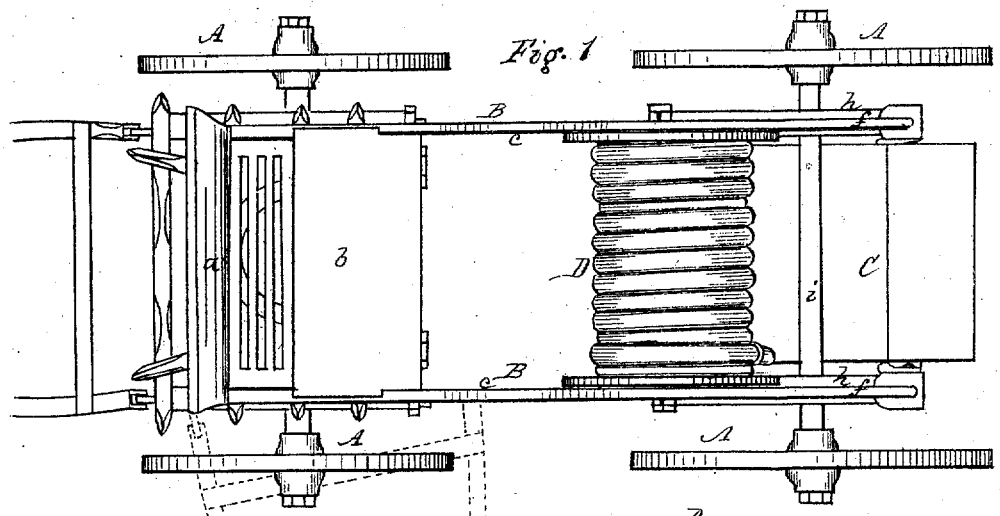
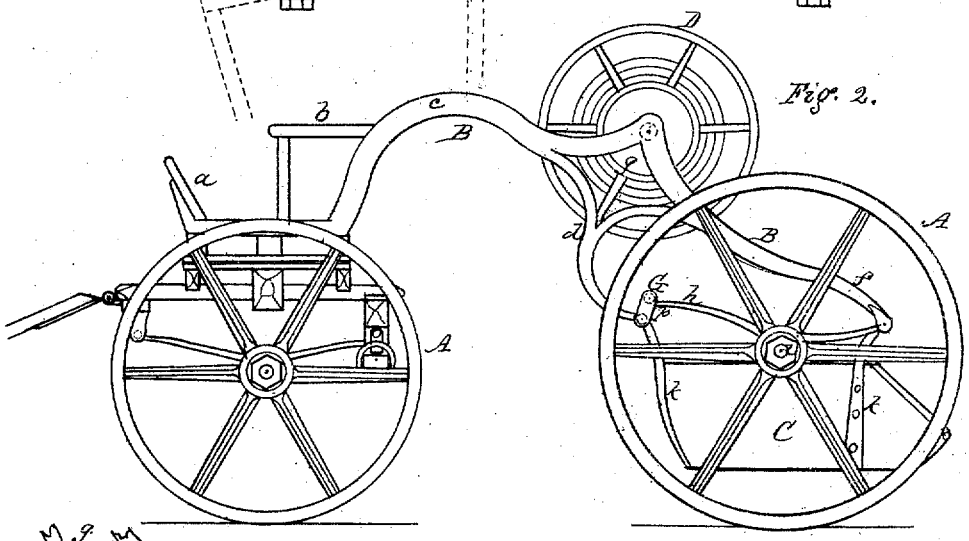
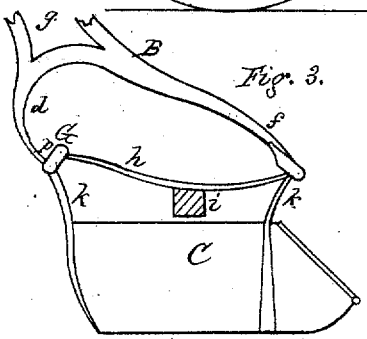
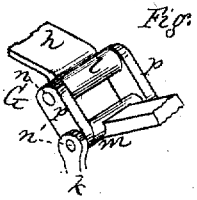
Witnesses.
Archie Baine
H. M. Thomas
Inventors.
Robt Perrine
Saml M. Stewart,
Per R. F. Osgood, atty.
AM. PHOTO-LITHOGRAPHIC CO. N.Y. (OSBORNE'S PROCESS.)

UNITED STATES PATENT OFFICE.

ROBERT PERRINE AND SAMUEL M. STEWART, OF ROCHESTER, NEW YORK.

IMPROVEMENT IN HOSE-CARRIAGES.

Specification forming part of Letters Patent No. 47,330, dated April 18, 1865; reissue No. 5,032, dated August 13, 1872.

SPECIFICATION.

*To all whom it may concern:*

Be it known that we, ROBERT PERRINE and SAMUEL M. STEWART, of Rochester, in the county of Monroe and State of New York, have invented a new and useful Improvement in Steam Fire-Engine Tenders and Hose-Carriages; and we do hereby declare that the following is a full and exact description thereof, reference being had to the accompanying drawing making part of this specification.

Figure 1 is a plan of our improved carriage; Fig. 2, a side elevation of the same; Fig. 3, a diagram showing an elevation of the rear portion of the carriage, and exhibiting particularly the manner of connecting the parts with the springs; Fig. 4, a view of the joint connecting the parts with the springs.

Like letters of reference indicate corresponding parts in all the figures.

Our invention consists in the employment of a "crane" or frame on each side of the carriage for supporting the hose-reel so arranged as to furnish the greatest amount of strength and to allow the front wheels to run under the same to turn short; also, in the peculiar connection of the same and the box that contains the fuel with a single spring on each side, which thus answers to give the desired elasticity to both cranes and fuel-box.

As represented in the drawing, A A are the supporting-wheels, and B B the cranes, one on each side, thus forming the frame of the carriage. These cranes are made of metal, and the front portion is of such shape as to receive the foot-board *a* and seat *b* of the driver. In the rear of this, concentric with the king-bolt or axis on which the axle of the front wheel turns, the cranes are formed into arches *c c*, of sufficient height or so raised as to allow the front wheels to run under in turning around. From thence they extend downward and backward a suitable distance, when they separate into two branches, *d* and *f*, with an open space, *g*, forming an enlargement between the branches *d*, uniting with the front end of springs *h*, resting on top the rear axle *i*, and the branches *f*, connecting in like manner with the rear end of said springs. We prefer half-elliptical springs, as shown, but, if desired, entire elliptical springs may be employed, or other form that will produce the desired result. The hose-reel D rests in the cranes B above the enlargement *g*. The fuel-box C, for containing the reserve for the engine, is also suspended beneath the axle *i*, to the springs *h h*, by means of suspending-rods *k k*. In connecting the branches *d* of the cranes B and the suspension-rods *k* of the fuel-box C with the springs *h*, in front, we prefer the joint G indicated most clearly in Fig. 4. The end of each spring is formed into an eye or socket, *l*, and the end of each branch *d* into a similar eye or socket, *m*. Through these eyes pass bearings *n n'* of a yoke or clevis, *p*, substantially of the form indicated. On the end of the bearing *n'* the suspension-rod *k* is attached. By the formation of the cranes as before described they may be made of iron and very light. The front is so formed that the seat is readily attached, while the arches *c c* in the rear not only give greater strength than would be attained if they were merely horizontal, but they enable the front wheels to run under, (as indicated by dotted lines, Fig. 1,) so that the carriage may be turned short around, as is frequently necessary, and by this means the horse may be hitched securely to the hind wheels in standing. The enlargement *g* gives the requisite strength to the cranes, for it is over this enlargement that the hose-wheel rests, and it is also on the center of the cranes that the greatest strain comes. It will be seen that by this arrangement there can be no sagging or bending of the cranes, and the same can be made of exceeding lightness. By the arrangement before described, it will also be perceived that both the cranes and the fuel-box C are connected with the springs *h h*, so as to give the necessary elasticity to each, and that without any intermediate parts or other connection with the rear axle.

We are aware of no other arrangement in which the fuel-box is connected with a hose-carriage, nor one in which both cranes and box are connected with the same springs. Ordinary construction would require separate springs for the fuel-box. The fuel-box when filled weighs several hundred pounds, and, adding to this the weight of an attendant, some elasticity is required in driving rapidly over the roughly-paved streets of a city to prevent breakage or disarrangement. This effect is accomplished perfectly in our device. The joints G are also of importance, for they allow the necessary play and adaptation of the cranes and the fuel-box—that is, as the springs lengthen by compression, the joints correspondingly shorten in the same degree, and vice versa. They furnish also the most convenient means of attachment and connection of the parts.

What we claim, and desire to secure by Letters Patent, is—

1. In a four-wheeled hose-carriage or steam fire-engine tender, cranes B B, located on opposite sides and constituting the frame of the carriage, when said cranes are separate and distinct from each other, and are formed with arches or raises concentric with the turning of the front wheels, as herein shown and described, and for the purpose specified.

2. We claim the construction of the cranes with the branches *d* and *f*, and having the enlargement *g* at or near the center thereof, for the support of the hose-reel, as herein shown and described.

3. We claim, in a hose-carriage and steam fire-engine tender, the combination, with the side cranes B B and fuel-box C, of the single side springs *h h*, to which both of said parts are attached, as herein shown and described.

4. We claim, in combination with the springs *h*, suspension-rods *k*, and branches *d*, the compensating-joint G, constructed and arranged as described, and operating in the manner and for the purpose specified.

In witness whereof we have hereunto signed our names in presence of two subscribing witnesses.

ROBERT PERRINE.
SAMUEL M. STEWART.

Witnesses:
R. F. OSGOOD,
ARCHIE BAINE.